US010981419B2

(12) United States Patent
Kubota et al.

(10) Patent No.: US 10,981,419 B2
(45) Date of Patent: Apr. 20, 2021

(54) PNEUMATIC TIRE

(71) Applicant: The Yokohama Rubber Co., LTD., Hiratsuku (JP)

(72) Inventors: Masataka Kubota, Hiratsuka (JP); Yuji Minami, Hiratsuka (JP)

(73) Assignee: The Yokohama Rubber Co., LTD.

( * ) Notice: Subject to any disclaimer, the term of this patent is extended or adjusted under 35 U.S.C. 154(b) by 620 days.

(21) Appl. No.: 14/770,422

(22) PCT Filed: Feb. 25, 2014

(86) PCT No.: PCT/JP2014/054532
§ 371 (c)(1),
(2) Date: Aug. 25, 2015

(87) PCT Pub. No.: WO2014/129654
PCT Pub. Date: Aug. 28, 2014

(65) Prior Publication Data
US 2016/0001603 A1 Jan. 7, 2016

(30) Foreign Application Priority Data
Feb. 25, 2013 (JP) .............................. JP2013-034624

(51) Int. Cl.
*B60C 3/04* (2006.01)
*B60C 11/03* (2006.01)
(Continued)

(52) U.S. Cl.
CPC ............ *B60C 11/0304* (2013.01); *B60C 3/04* (2013.01); *B60C 5/00* (2013.01); *B60C 11/033* (2013.01);
(Continued)

(58) Field of Classification Search
CPC ............... B60C 11/033; B60C 11/0304; B60C 2011/0348; B60C 3/04
(Continued)

(56) References Cited

U.S. PATENT DOCUMENTS

| 5,421,391 A * | 6/1995 | Himuro ............... B60C 11/0302 |
| | | 152/209.18 |
| 2004/0134582 A1* | 7/2004 | Murata ............... B60C 11/0302 |
| | | 152/209.18 |

(Continued)

FOREIGN PATENT DOCUMENTS

| CN | 101462471 | 6/2009 |
| CN | 101772429 | 7/2010 |

(Continued)

OTHER PUBLICATIONS

English machine translation of JP02-234803 (Year: 1990).*
(Continued)

*Primary Examiner* — Robert C Dye
(74) *Attorney, Agent, or Firm* — Thorpe North & Western

(57) ABSTRACT

A ratio between the total width (SW) and outer diameter (OD) of a pneumatic tire, which has an asymmetrical pattern formed by grooves formed on a tread part, satisfies SW/OD≤0.3. Given a ground contact width (CW) in a ground contact region in the tread part, a groove area ratio (GR), and a groove area ratio (GRi) of a tire inner side region (Ai), which spans from a tire equator line (CL) to the vehicle side in the ground contact region, and a groove area ratio (GRo) of a tire outer side region (Ao), which spans from the tire equator line to the opposite side of the vehicle side in the ground contact region, the ground contact region is formed to satisfy 0.75≤CW/SW≤0.9, 10≤GR≤25%, and GRi<GRo.

25 Claims, 3 Drawing Sheets

(51) Int. Cl.
  *B60C 11/12* (2006.01)
  *B60C 11/04* (2006.01)
  *B60C 5/00* (2006.01)

(52) U.S. Cl.
  CPC .......... *B60C 11/0306* (2013.01); *B60C 11/04* (2013.01); *B60C 11/1236* (2013.01); *B60C 2011/0348* (2013.01); *B60C 2011/0372* (2013.01); *B60C 2011/0388* (2013.01); *Y02T 10/86* (2013.01)

(58) Field of Classification Search
  USPC .................................................. 152/209.27
  See application file for complete search history.

(56) References Cited

U.S. PATENT DOCUMENTS

| | | | |
|---|---|---|---|
| 2010/0200134 A1 | 8/2010 | Murata | |
| 2010/0263775 A1* | 10/2010 | Watanabe | B60C 11/12 152/209.8 |
| 2012/0060987 A1 | 3/2012 | Nemoto | |
| 2013/0042953 A1 | 2/2013 | Kuwayama | |
| 2013/0213545 A1* | 8/2013 | Tanaka | B60C 3/04 152/454 |
| 2013/0220501 A1* | 8/2013 | Hatanaka | B60C 11/04 152/209.18 |
| 2013/0292018 A1 | 11/2013 | Murata | |
| 2014/0158263 A1* | 6/2014 | Hatanaka | B60C 3/04 152/209.18 |

FOREIGN PATENT DOCUMENTS

| | | | |
|---|---|---|---|
| DE | 694 02 461 | | 10/1997 |
| JP | 01-168506 | * | 7/1989 |
| JP | 02-234803 | * | 9/1990 |
| JP | 06-239110 | * | 8/1994 |
| JP | 2006-192929 | | 7/2006 |
| JP | 2006-240591 | * | 9/2006 |
| JP | 2009040156 | | 2/2009 |
| JP | 2009149124 | | 7/2009 |
| JP | 2012056479 | | 3/2012 |
| JP | 2013-028289 | | 2/2013 |
| JP | 2013028289 | | 2/2013 |
| WO | WO 2009/020077 | | 2/2009 |
| WO | WO2009020077 | | 2/2009 |
| WO | WO/2011/135774 | | 11/2011 |
| WO | WO2012/066725 | * | 5/2012 |
| WO | WO2013/014950 | * | 1/2013 |

OTHER PUBLICATIONS

English machine translation of JP2006-240591 (Year: 2006).*
English machine translation of JP06-239110 (Year: 1994).*
English machine translation of JP01-168506. (Year: 1989).*
International Search Report for International Application No. PCT/JP2014/054532 dated Apr. 1, 2014, 4 pages, Japan.
"Pleasure" second generation Playz new release that has evolved, as accessed Aug. 26, 2015 from web page http://www.bridgestone.co.jp/corporate/news/2008120301.html, Dec. 3, 2008, 16 pages, Bridgestone Corporation, Japan.
Oponeo, Tire Size—How to Find the Right One?, online, https://www.oponeo.de/reifen-abc/reifengrosse, retrieved on Jun. 6, 2019, 36 pages, Germany.

* cited by examiner

US 10,981,419 B2

PNEUMATIC TIRE

TECHNICAL FIELD

The present technology relates to a pneumatic tire which lowers fuel consumption.

BACKGROUND

In the related art, pneumatic tires for reducing rolling resistance have been proposed in order to contribute to lowering the fuel consumption of automobiles such as hybrid automobiles (HV) and electric vehicles (EV) in particular. In recent years, as concern for the environment has increased, there has been a demand for pneumatic tires with a higher contribution to lowering the fuel consumption of automobiles.

As a method for reducing the rolling resistance of pneumatic tires, there is known a method for reducing the air resistance around the tire by decreasing the front surface projection area (the projection area of the pneumatic tire when viewed from the rolling direction) by narrowing the total width (SW) of the pneumatic tire (for example, refer to International Patent Publication No. WO/2011/135774).

However, in the method described above, since the ground contact width is also narrowed as the total width of the pneumatic tire is narrowed, there are concerns that the cornering force (CF) will decrease and the steering stability will deteriorate.

In the related art, as a countermeasure to this deterioration in the steering stability, in order to improve the steering stability, the groove area ratio of the tire outer side region, which is positioned further to the opposite side to the vehicle side from the tire equator line, is made to be greater than the groove area ratio of the tire inner side region positioned further to the vehicle side from the tire equator line (for example, refer to Japanese Unexamined Patent Application Publication No. 2009-149124A).

However, in a pneumatic tire in which the groove area ratio of the tire outer side region is greater than the groove area ratio of the tire inner side region, while the steering stability is improved, there is a concern that the water drainage performance while turning will deteriorate.

SUMMARY

The present technology provides a pneumatic tire achieving both of improving steering stability and maintaining the water drainage properties while reducing the rolling resistance.

The present technology provides a pneumatic tire which has an asymmetrical pattern formed by grooves formed on a tread part, wherein a ratio between a total width SW and an outer diameter OD of the pneumatic tire satisfies the relationship $SW/OD \leq 0.3$, and when a ground contact width in a ground contact region in the tread part is set as CW and a groove area ratio is set as GR, a range, when the pneumatic tire is mounted on a vehicle, positioned from a tire equator line to the vehicle side in the ground contact region is set as a tire inner side region Ai and a groove area ratio in the tire inner side region Ai is set as GRi, and a range, when the pneumatic tire is mounted on a vehicle, positioned from the tire equator line to the opposite side to the vehicle side in the ground contact region is set as a tire outer side region Ao and a groove area ratio in the tire outer side region Ao is set as GRo, the ground contact region is formed so as to satisfy the relationships $0.75 \leq CW/SW \leq 0.9$, $10\% \leq GR \leq 25\%$, and $GRi < GRo$.

According to the pneumatic tire of the present technology, it is possible to achieve both of improving steering stability and maintaining the water drainage properties while turning while reducing the rolling resistance.

BRIEF DESCRIPTION OF THE DRAWING(S)

DETAILED DESCRIPTION

Embodiment

Figure 1:
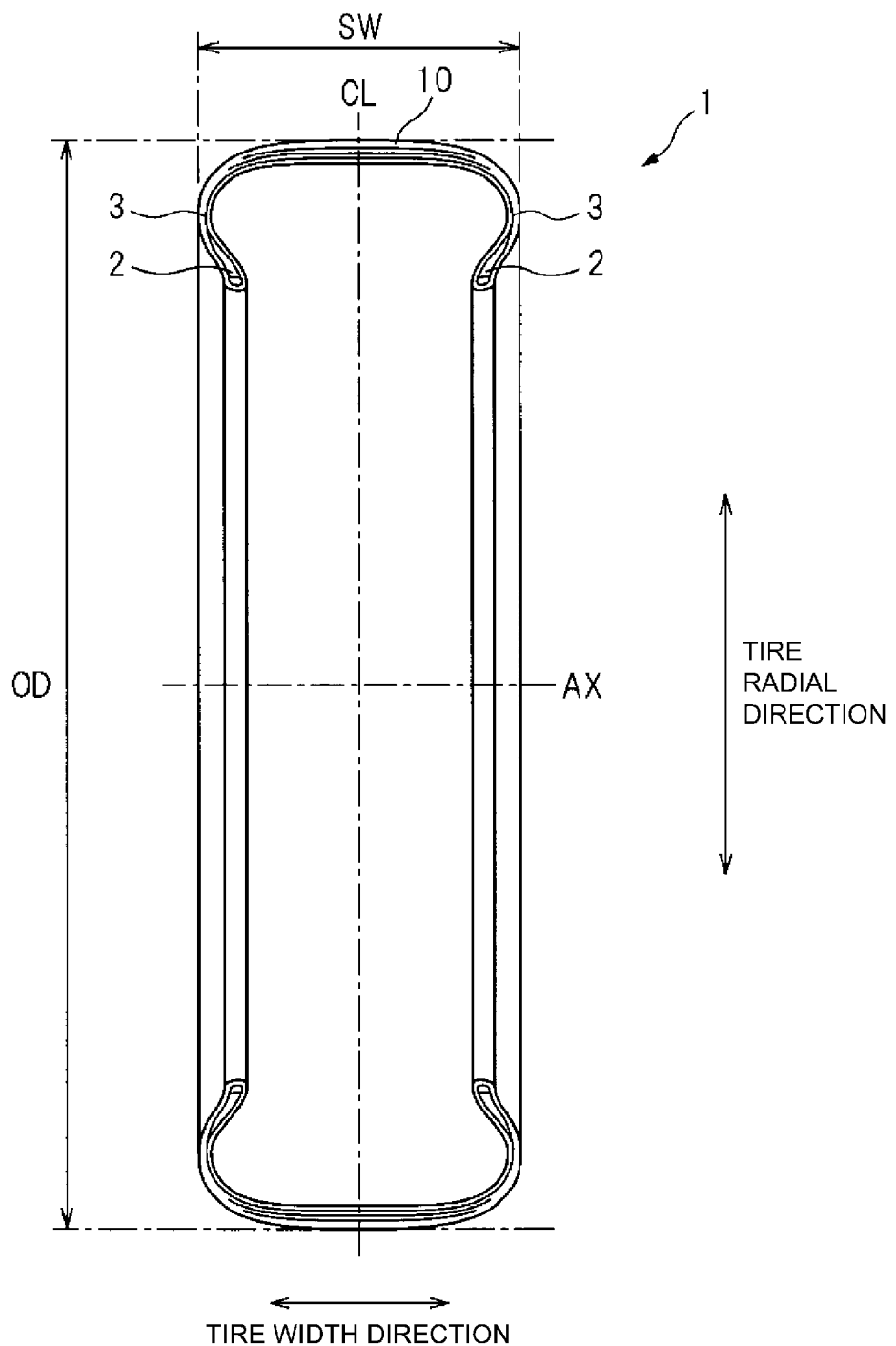
FIG. 1 is a meridian cross-sectional view of a pneumatic tire according to an embodiment of the present technology.

Description will be given below of a pneumatic tire 1 according to the embodiment of the present technology with reference to the drawings. FIG. 1 is a meridian cross-sectional view of the pneumatic tire 1 according to the embodiment of the present technology. Here, the pneumatic tire 1 of the present embodiment has the same meridian cross-sectional shape as a conventional pneumatic tire. Here, the meridian cross-sectional shape of the pneumatic tire refers to the cross-sectional shape of the pneumatic tire as it appears on a plane normal to the tire equator CL.

In the following description, the term "tire radial direction" refers to a direction orthogonal to a rotational axis AX of the pneumatic tire 1. The term "tire circumferential direction" refers to the direction of rotation around the rotational axis AX (see FIG. 2). In addition, the tire width direction refers to a direction parallel to the rotation axis AX. "Tire equator CL" refers to a plane that is orthogonal to the rotational axis AX of the pneumatic tire 1 and that passes through the center of the width of the pneumatic tire 1. "Tire equator line" refers to a line along the tire circumferential direction of the pneumatic tire 1 that lies on the tire equator CL. In the present specification and drawings, the tire equator line is labeled identically to the tire equator as "CL".

The pneumatic tire 1 of the present embodiment is provided with a pair of bead sections 2, side wall sections 3 continuous with the bead sections, and a tread part 10 linking the side wall sections 3 in the tire meridian cross-section.

In the pneumatic tire 1 of the present embodiment, the ratio of the total width SW and the outer diameter OD satisfies a relationship $SW/OD \leq 0.3$ <1>.

Here, in the present technology, the total width SW is the interval between the side walls including designs on the side walls in an unloaded state where the pneumatic tire 1 is assembled on a rim and filled with an internal pressure at 230 [kPa] (optionally set internal pressure) for defining the size of the pneumatic tire 1, and the outer diameter OD is the outer diameter of the tire at this time. Here, the internal pressure of 230 [kPa] as described above is selected in order to define the size of the pneumatic tire. Accordingly, as long as the pneumatic tire 1 according to the present technology is filled with an internal pressure in a range of normal use, the effects of the present technology are exhibited and it should be noted that filling with an internal pressure of 230 [kPa] is not necessary to implement the present technology.

Here, the rim used in the present technology has a rim diameter adapted to the inner diameter of the pneumatic tire 1 and has a nominal rim width corresponding to the defined rim width Rm [mm] indicated in Table 2 closest to a value determined in conformance with ISO4000-1: 2001 by the product (Rm=K1×Sn) of a nominal tire cross-sectional width Sn and a coefficient K1 set in a table corresponding to Table 1 using the aspect ratio of the rim-assembled tire.

TABLE 1

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Figure 2:
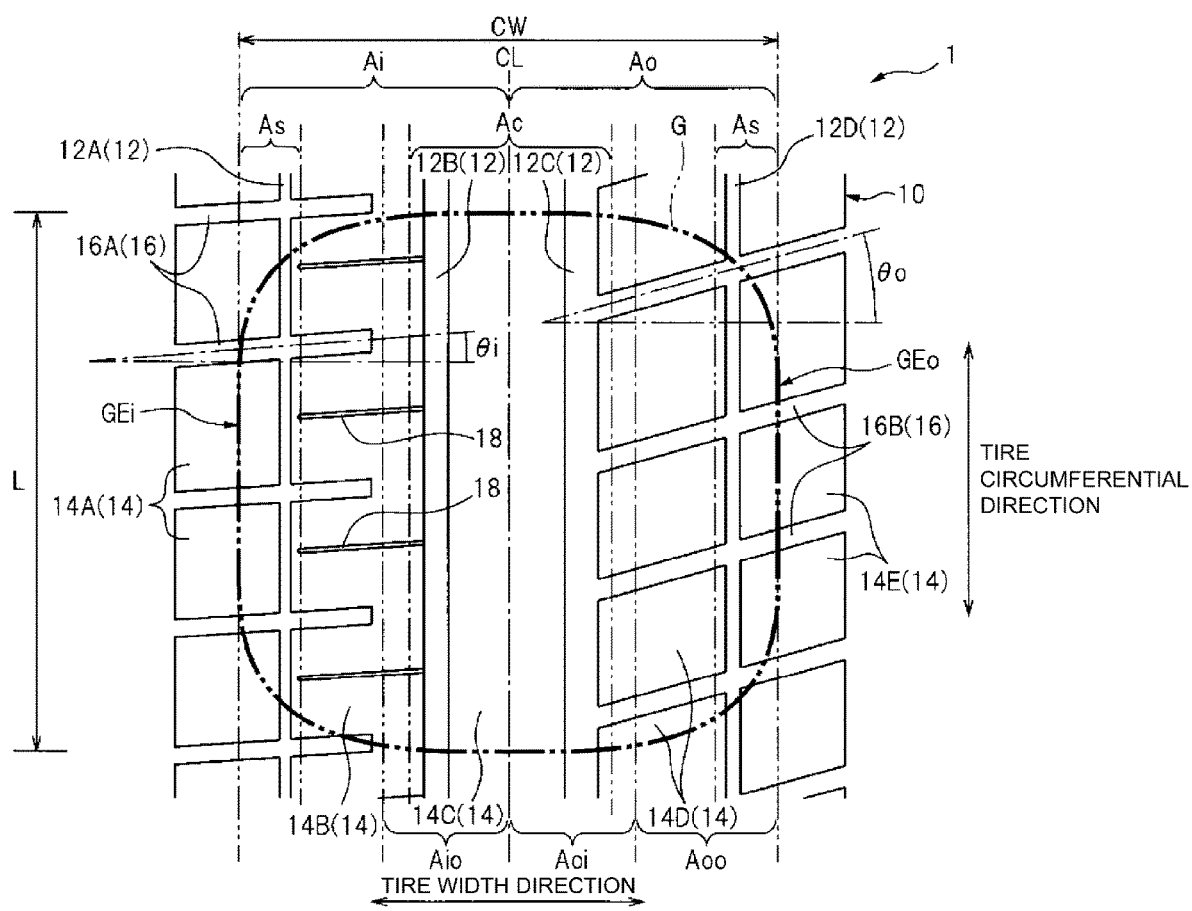
FIG. 2 is a planar developed view illustrating a part of a tread part of the pneumatic tire according to the embodiment of the present technology.

FIG. 2 is a planar developed view illustrating a part of the tread part 10 of the pneumatic tire 1 according to the embodiment of the present technology. FIG. 2 illustrates that the side to the left of the tire equator line CL is the vehicle side when the pneumatic tire is mounted on the vehicle and the side to the right of the tire equator line CL is the opposite side to the vehicle side when the pneumatic tire is mounted on the vehicle. That is, in the present specification and the drawings, description will be given with the pneumatic tire 1 mounted on the right side of the vehicle.

In the tread part 10 of the pneumatic tire 1 of the present embodiment, four circumferential grooves 12A, 12B, 12C, and 12D extending in the tire circumferential direction and land portions 14A, 14B, 14C, 14D, and 14E defined by each of the circumferential grooves 12A, 12B, 12C, and 12D are formed. In the land portions 14A, 14B, 14D, and 14E, a plurality of width direction grooves 16A and 16B and sipes 18, which are grooves arranged in the tread part 10 other than the grooves 12A, 12B, 12C, and 12D and which extend in a direction crossing the tire circumferential direction, are formed. Here, in the present specification, the circumferential grooves 12 and the width direction grooves 16 are collectively referred to as the grooves 12 and 16. In the present technology, the circumferential grooves 12 and the width direction grooves 16 have a groove width of 1.5 mm or more, and the sipes 18 have a groove width of less than 1.5 mm. As illustrated in FIG. 2, an asymmetrical pattern is formed in the tread part 10 by the configuration of the grooves 12 and 16, the land portions 14, and the sipes 18.

Furthermore, the pneumatic tire 1 according to the present embodiment is formed such that the ratio of the total width SW and the ground contact width CW satisfies a relationship $$0.75 \leq CW/SW \leq 0.9 \qquad <2>.$$

In the present technology, the ground contact width CW is the maximum width in the tire width direction of the ground contact region G which is the region of the ground contact surface when the pneumatic tire 1 is rim-assembled with the rim described above, filled with an internal pressure of 230 [kPa], and made to contact the ground with a flat surface by applying a load equivalent to 80% of the load capacity thereto. Here, the ground contact length L is the maximum length of the ground contact region G in the tire circumferential direction.

In the present technology, the load capacity is determined based on ISO4000-1: 1994. However, the ISO standards describe defining, by calculation on an individual basis, sizes for which a load capacity index is not set therein in consideration of conformance with various foreign standards. In such a case, the load capacities are calculated based on the standards for each country. Accordingly, in the present technology, in practice, the load capacity is calculated for each tire size from the following calculation formula (c) described in the explanation of "Calculation of Load Capacity" in JIS D4202-1994 using the load capacity calculation formula adopted in the JIS standards.

$$X = K \times 2.735 \times 10{-5} \times P^{0.585} \times Sd^{1.39} \times (D_R - 12.7 + Sd)$$

Here, X=load capacity [kg]
K=1.36
P=230 (=air pressure [kPa])
$Sd = 0.93 \times S_1 - 0.637d$
$S_1 = S \times ((180° - Sin^{-1}((Rm/S))/131.4°)$
S=design cross-section width [mm]
$R_m$=rim width [mm] corresponding to design cross-section width
d=(0.9−aspect ratio[−])×$S_{0.75}$−6.35
$D_R$=rim diameter reference value [mm]

For the pneumatic tire 1 according to the present embodiment, in order to satisfy the relationship in Formula <2> described above, the shape of the interior structure as illustrated in FIG. 1, the contour shape of the tread part 10 surface in the meridian cross-sectional view, and the material of each member of the pneumatic tire 1 can be determined in a conventional manner, for example, by prototype testing, simulation, or the like.

Furthermore, when the pneumatic tire 1 according to the present embodiment is mounted on the vehicle, in the ground contact region G of the tread part 10, the groove area ratio GR in the ground contact region G, the groove area ratio GRi in the tire inner side region Ai, and the groove area ratio GRo in the tire outer side region Ao are formed so as to satisfy the following relationships.

$$10\% \leq GR \leq 25\% \qquad <3>$$

$$GRi < GRo \qquad <4>.$$

Here, the groove area ratio GR is the ratio of the groove area with respect to the total (=ground contact area) of the land portion area and the groove area in the ground contact region G.

Furthermore, as illustrated in FIG. 2, when the pneumatic tire is mounted on a vehicle, the tire inner side region Ai is a range positioned on the vehicle side from the tire equator line CL in the ground contact region G and having a width of half of the ground contact width W. Also, when the pneumatic tire is mounted on a vehicle, the tire outer side region Ao is a range positioned on the opposite side to the vehicle side from the tire equator line CL in the ground contact region and having a width of half of the ground contact width W. Then, the groove area ratio GRi in the tire inner side region Ai is the ratio of the groove area with respect to the total of the land portion area and the groove area in the tire inner side region Ai and the groove area ratio GRo in the tire outer side region Ao is the ratio of the groove area with respect to the total of the land portion area and the groove area in the tire outer side region Ao.

The pneumatic tire 1 according to the present embodiment can achieve the following operational effects.

(1) The pneumatic tire 1 according to the present embodiment is formed such that the ratio of the total width SW and the outer diameter OD satisfies the relationship in Formula <1> described above. Due to this, in comparison with a pneumatic tire with a typical size (for example, 205/55R16 (SW/OD=0.32)), the total width SW is narrowed relative to the outer diameter OD. As a result, the front surface projection area of the pneumatic tire 1 is small, the air resistance around the tire is reduced, and the rolling resistance of the pneumatic tire 1 can be reduced. On the other hand, when just the total width SW is narrowed, the load capacity of the pneumatic tire 1 decreases; however, since the outer diameter OD is relatively large with respect to the total width SW as a result of satisfying Formula <1>, decreases in the load capacity can be prevented.

(2) The pneumatic tire 1 according to the present embodiment is formed such that the ratio of the total width SW and the ground contact width CW satisfies Formula <2> described above. Accordingly, the steering stability can be improved by widening the ground contact width CW relative to the comparatively narrow total width SW as described above in (1) and enlarging the shape of the ground contact region G in the tire width direction.

(3) The pneumatic tire 1 according to the present embodiment is formed such that the groove area ratio GR with respect to the ground contact area has a value in the range illustrated in Formula <3> described above. The range of the groove area ratio GR is set to be low in comparison with a typical pneumatic tire. Due to this, by increasing the area where the land portions 14 contact the ground, the rigidity of the tread part 10 is increased and the steering stability can be improved. Here, when the groove area ratio GR is higher than 25%, the rigidity of the tread part 10 deteriorates such that it is not possible to obtain sufficient cornering force, whereby it is difficult to improve the steering stability. Then, when the total width SW is narrow as described above, the water drainage properties are improved; however, when the groove area ratio GR is lower than 10%, there are fewer of the grooves 12 and 16 provided in the tread part 10 such that it is not possible to sufficiently drain water in the ground contact region G, whereby it is difficult to maintain the overall drainage.

(4) The pneumatic tire 1 according to the present embodiment is formed such that the groove area ratio GRo in the tire outer side region Ao and the groove area ratio GRi in the tire inner side region Ai satisfy the relationship in Formula <4> described above. Due to this, there are more grooves provided in the tire outer side region Ao than in the tire inner side region Ai. Accordingly, the water drainage properties during turning can be improved.

(5) As described in (1), when compared with a pneumatic tire with a typical size, the outer diameter OD is relatively large and the total width SW is relatively narrow in the pneumatic tire 1 according to the present embodiment. Accordingly, it is possible to anticipate space savings in automobiles, improvements in design, and the like.

Furthermore, the groove area ratio GR more preferably satisfies a relationship

15%≤GR≤22%.

This is because the rigidity of the tread part 10 is increased in the tire outer side region Ao while preventing deterioration in the water drainage properties and it is possible to improve the steering stability to a higher level.

In addition, the groove area ratios GR, GRi, and GRo preferably satisfy a relationship $$0.1 \leq (GRo-GRi)/GR \leq 0.6 \qquad <5>.$$

This is because it is possible to increase the rigidity of the tread part 10 in the tire outer side region Ao and improve the steering stability while preventing deterioration in the water drainage properties. Here, on the other hand, when "(GRi−GRo)/GR" is smaller than 0.1, it is not possible to sufficiently prevent deterioration in the water drainage properties. On the other hand, when "(GRi−GRo)/GR" is greater than 0.6, there are cases where the block rigidity of the tread part 10 in the tire inner side region Ai is excessively deteriorated, leading to deterioration in the steering stability.

Furthermore, the groove area ratios GR, GRi, and GRo more preferably satisfy a relationship 0.2≤(GRo−GRi)/GR≤0.4.

This is because it is possible to achieve both of preventing deterioration in the water drainage properties and improving the steering stability to a higher level by increasing the block rigidity and the ground contact area.

Here, with reference to FIG. 2, the tire outer-inner side region Aoi and the tire inner-outer side region Aio will be defined. The tire outer-inner side region Aoi is a range positioned on the tire equator line CL side in the tire outer side region Ao and having a width of 25% of the ground contact width CW. Then, the tire inner-outer side region Aio is a range positioned on the tire equator line CL side in the tire inner side region Ai and having a width of 25% of the ground contact width CW.

Since the ground contact length L of the pneumatic tire 1 according to the present embodiment is comparatively long as a result of satisfying Formula <1> described above, the groove area ratio in the tire width direction central portion of the tread part 10 has a greater effect on the water drainage properties. Along with this, the groove area ratio GRoi in the tire outer-inner side region Aoi and the groove area ratio GRio in the tire inner-outer side region Aio preferably satisfy a relationship $$GRoi>GRio \qquad <6>.$$

This is because, in the central portion in the tire width direction of the tread part 10 with a large effect on the water drainage properties, a greater number of the grooves 12 and 16 are arranged in the tire outer side region Ao with a large effect on the water drainage properties than in the tire inner side region Ai.

Furthermore, here, the tire outer-outer side region Aoo will be defined. The tire outer-outer side region Aoo is a range positioned on a ground contact edge GEo side in the tire width direction in the tire outer side region Ao and has a width of 25% of the ground contact half-width CW other than the tire outer-inner side region Aoi. At this time, the groove area ratio GRoi in the tire outer-inner side region Aoi and the groove area ratio Groo in the tire outer-outer side region Aoo preferably satisfy a relationship $$GRoi > GRoo \qquad <7>.$$

This is because, in the tire outer side region Ao, by providing a greater number of grooves 12 and 16 in the tire outer-inner side region Aoi which is positioned on the central portion side in the tire width direction of the tread part 10 and which has a greater influence on the water drainage properties than the tire outer-outer side region Aoo, it is possible to further improve the steering stability while preventing deterioration in the water drainage properties.

As described above, in the pneumatic tire 1 according to the present embodiment, the groove area ratio in the central portion in the tire width direction of the tread part 10 has a large effect on the water drainage properties. Accordingly, the circumferential grooves 12 extending in the tire circumferential direction are preferably provided in a central region Ac which is a range centering on the central portion in the tire width direction of the tread part 10, specifically, the tire equator line, and having a width of 40% of the ground contact width CW. Referring to FIG. 2, in the pneumatic tire 1 of the present embodiment, the circumferential grooves 12B and 12C are provided in the central region Ac. Accordingly, deterioration in the water drainage properties can be further prevented. Here, for the same reason as Formula <6>, the circumferential grooves 12 are more preferably provided further to the tire outer side region Ao side from the tire equator line CL in the central region Ac.

In addition to the effect of preventing deterioration in the water drainage properties, by providing the circumferential grooves 12 in the central region Ac, the width in the tire width direction of the land portions 14 positioned further to the ground contact edge side in the tire width direction from the circumferential grooves 12B and 12C is widened. Due to this, it is also possible to improve the steering stability. However, in the present technology, as in the pneumatic tire 1 according to the present embodiment, the circumferential grooves 12 need not be provided in the central region Ac.

In addition, the width direction grooves 16A and 16B extending in a direction crossing the tire equator line are provided in the tread part 10 of the pneumatic tire 1 according to the present embodiment, and these width direction grooves 16A and 16B are inclined relative to the tire width direction. Due to this, since the water entering inside the ground contact region G when the pneumatic tire 1 rolls on a wet road surface is drained from the ground contact front end side (leading edge) to the ground contact rear end side (trailing edge), the water entering inside the ground contact region G can be drained more smoothly when the width direction grooves 16A and 16B have an angle close to parallel with the circumferential grooves 12.

In other words, when the angle of inclination with respect to the tire width direction of the width direction grooves 16 is increased, there is an advantage in terms of the water drainage properties during turning. Accordingly, furthermore, as in the pneumatic tire 1 according to the present embodiment, the angle of inclination θo of the width direction grooves 16B provided in the tire outer side region Ao with respect to the tire width direction is preferably larger than the angle of inclination θi of the width direction grooves 16A provided in the tire inner side region Ai with respect to the tire width direction. This is because, in relation to the angle of inclination of the width direction grooves 16 with respect to the tire width direction, the tire outer side region Ao contributes more than the tire inner side region Ai to the water drainage properties during turning, and it is possible to efficiently improve the water drainage properties during turning.

However, in the pneumatic tire according to the present technology, the angle of inclination θo of the width direction groove 16B provided in the tire outer side region Ao with respect to the tire width direction may be identical to or smaller than the angle of inclination θi of the width direction groove 16A provided in the tire inner side region Ai with respect to the tire width direction. Furthermore, in the pneumatic tire according to the present technology, the circumferential grooves 16 may extend in parallel to the tire width direction without inclining relative to the tire width direction, and need not be provided in the tread part 10.

Here, the shoulder regions As will be defined. The shoulder regions As are ranges in the tire inner side region Ai and the tire outer side region Ao from the ground contact edges GEo and GEi in the tire width direction to the tire equator line and each have a width of 15% of the ground contact width CW. Then, in the pneumatic tire 1 according to the present embodiment, the circumferential grooves 12A and 12D are provided in the shoulder regions As of the tread part 10. The groove widths of the circumferential grooves 12A and 12D are thin in comparison with the circumferential grooves 12B and 12C arranged in the central region Ac. Here, in the present technology, the circumferential grooves having a groove width of 1.5 mm or more to 3.0 mm or less are referred to as the circumferential direction narrow grooves 12A and 12D.

The circumferential direction narrow grooves 12A and 12D are preferably provided in the shoulder regions As of the tread part 10 as in the pneumatic tire 1 according to the present embodiment, in other words, circumferential direction narrow grooves are preferably provided in at least one of the shoulder regions As. This is because, by dispersing the interior stress which tends to focus in the shoulder regions As of the tread part 10 by providing the circumferential direction narrow grooves 12A and 12D, hysteresis loss due to the rolling of the pneumatic tire 1 is reduced and it is possible to reduce the rolling resistance. In addition, since the circumferential grooves 12A and 12D are provided in the shoulder regions As, there is also an effect of preventing deterioration in the water drainage properties during turning, which is preferable. However, the pneumatic tire according to the present technology need not be provided with the circumferential direction narrow grooves in the shoulder regions As.

Furthermore, it is preferable when the sipes 18 extending in a direction crossing the tire equator line are provided in the tire inner side region Ai as in the pneumatic tire 1 according to the present embodiment. This is because, by decreasing the tread rigidity of the portion where the sipes 18 are provided without significantly changing the groove area ratio, it is possible to adjust the rigidity balance of the entire tread part 10, and the steering stability can be improved. However, the pneumatic tire according to the present technology need not be provided with the sipes 18 in the tire inner side region Ai.

As described above, both the circumferential grooves 12 and the width direction grooves 16 are provided in the tread part 10 of the pneumatic tire 1 of the present embodiment. However, in the present technology, it is sufficient if the grooves 12 and 16 are provided in the tread part 10 of the pneumatic tire 1 and at least Formulas <2> to <4> are satisfied in the ground contact region G of the pneumatic tire 1. In other words, it is sufficient if either of the circumferential grooves 12 or the width direction grooves 16 is provided in the tread part 10 of the pneumatic tire 1 of the present technology so as to satisfy at least Formulas <2> to <4.>

EXAMPLES

In the present working example, tire performance tests were performed relating to the fuel economy index, the steering stability, and the water drainage properties during turning for pneumatic tires having various conditions.

These performance tests were performed after attaching a rim with the size described above adapted to each of the test tires and filling each tire with an internal pressure of 230 [kPa].

The methods used to execute performance testing on the tires will now be described.

(Fuel Efficiency)

The test tires were mounted on a front wheel drive vehicle with 1800 cc displacement, the vehicle traveled at 100 km/h on a test course with a total length of 2 km for 50 laps, and the fuel consumption improvement rate was measured with the fuel consumption rate of a Conventional Example set as 100. A higher index represents better fuel economy (Steering Stability)

The test tires were rim-assembled with standard rims and mounted on a passenger car (displacement 1800 cc) and the feeling when traveling three laps on a test course where one lap is 2 km while changing lanes was evaluated by three expert drivers. For the evaluation results, the average values of the evaluation points of each of the test tires are given as an index with the average value of the feeling evaluation points of a Conventional Example set to 100. A larger index value indicates a superior steering stability.

(Water Drainage Properties During Turning)

The test tires were mounted on a compact front wheel drive vehicle with a displacement of 1800 cc, the generated lateral acceleration was measured when the velocity was increased while turning on a road surface with a set water depth (average 10 mm) with a set radius (100 m), the velocity when the generated lateral acceleration was the maximum was set as the hydroplaning velocity, and the results are indicated as an index with a conventional tire set to 100. A higher index value means that the water drainage properties during turning is excellent.

Description will now be given of each of the test tires and the performance test results thereof.

Conventional Example

The pneumatic tire according to a Conventional Example had a tire size of 205/55R16 and the value of "SW/OD" was 0.32, that is, Formula <1> was not satisfied. The tread part of the pneumatic tire according to the Conventional Example was provided with the tread pattern illustrated in FIG. 3.

Working Examples 1 to 14

The pneumatic tires according to Working Examples 1 to 14 had various tire sizes and "SW/OD" had a value in a range of 0.30 to 0.21, that is, Formula <1> was satisfied. The tread part 10 of the pneumatic tire according to Working Examples 1 to 14 was provided with a tread pattern changed so as to adapt to each tire size based on the tread pattern illustrated in FIG. 3.

Performance tests relating to the fuel economy index, were performed for the pneumatic tires according to the Conventional Example and Working Examples 1 to 14. Table 3 illustrates the values relating to the dimensions of each test tire and the performance test results.

TABLE 3

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Nominal Width | 205 | 185 | 195 | 175 | 185 | 195 | 155 | 165 |
| Aspect ratio | 55 | 55 | 50 | 60 | 50 | 45 | 60 | 55 |
| Inner diameter [inches] | 16 | 17 | 18 | 17 | 19 | 21 | 17 | 18 |
| OD[mm] | 632 | 641 | 657 | 648 | 673 | 713 | 624 | 644 |
| SW/OD | 0.33 | 0.30 | 0.30 | 0.28 | 0.28 | 0.28 | 0.26 | 0.26 |
| Fuel economy index [—] | 100 | 100.1 | 100.1 | 100.2 | 100.2 | 100.2 | 100.3 | 100.3 |

|  | Working Example 8 | Working Example 9 | Working Example 10 | Working Example 11 | Working Example 12 | Working Example 13 | Working Example 14 |
|---|---|---|---|---|---|---|---|
| Nominal Width | 175 | 145 | 155 | 165 | 145 | 155 | 145 |
| Aspect ratio | 50 | 65 | 60 | 55 | 70 | 60 | 55 |
| Inner diameter [inches] | 20 | 17 | 19 | 20 | 17 | 20 | 21 |
| OD[mm] | 688 | 627 | 675 | 695 | 642 | 700 | 698 |
| SW/OD | 0.26 | 0.24 | 0.24 | 0.24 | 0.23 | 0.23 | 0.21 |
| Fuel economy index [—] | 100.3 | 100.4 | 100.4 | 100.4 | 100.4 | 100.4 | 100.4 |

According to the performance test results in Table 3, the test tires according to Working Examples 1 to 14 which satisfied Formula <1> were superior to the Conventional Example in terms of the fuel economy index. According to the performance test results, with the tire size 165/55R20 (Working Example 11) among the tested tire sizes, it was confirmed that the fuel economy was sufficiently improved relative to the tire size 205/55R16. Accordingly, this tire size was used for the tests relating to the subsequent tread patterns.

Working Examples 15 to 17 and Comparative Examples 1 to 3

The pneumatic tires according to Working Examples 15 to 17 and Comparative Examples 1 to 3 had a tire size of 165/55R20. The pneumatic tire according to Comparative Example 1 was a test tire for which only the tire size was changed from the Conventional Example. Then, the pneumatic tires according to the Working Examples 15 to 17 and Comparative Examples 2 and 3 were test tires in which "CW/SW" was 0.82, "(GRo−GRi)/GR" was 0.32, and the groove area ratios GR were distributed in a range of 5 to 27%. Here, the pneumatic tires according to the Working Examples 15 to 17 all satisfied the relationships in Formulas <1> to <4>; however, the pneumatic tires according to Comparative Examples 1 to 3 did not satisfy the relationship in Formula <3>.

Figure 3:
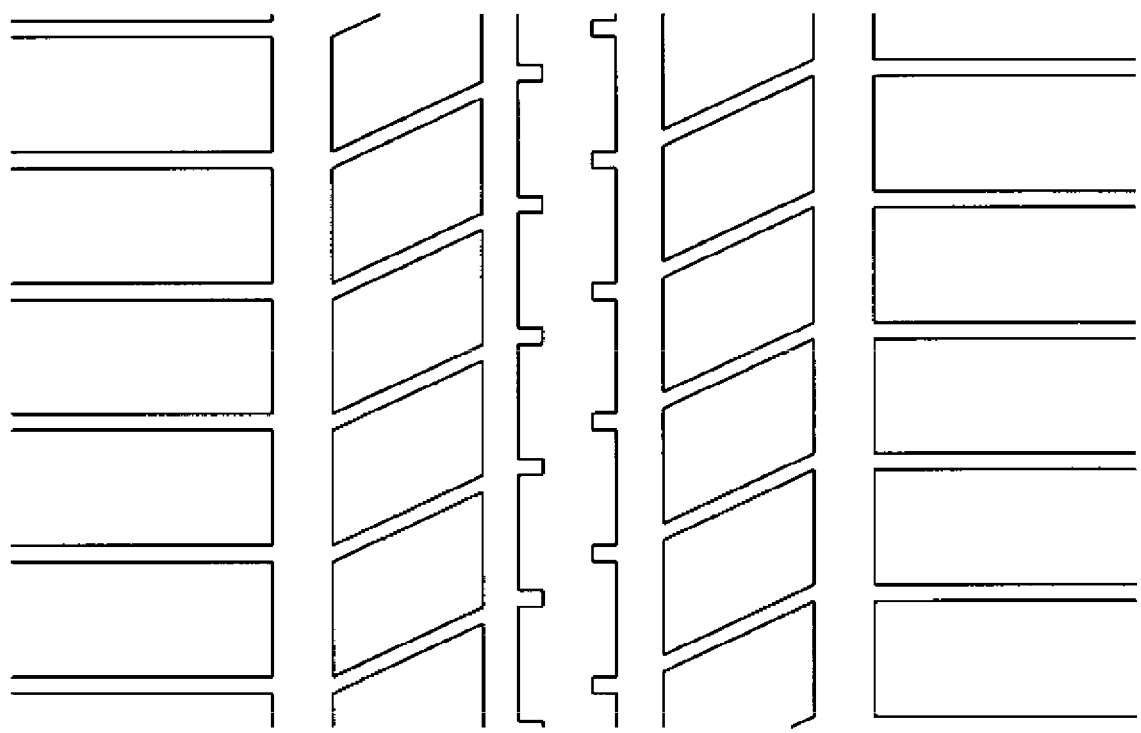
FIG. 3 is a planar developed view illustrating a part of a tread part of a pneumatic tire of a Conventional Example.

Here, the tread parts of the pneumatic tires according to the Working Examples and Comparative Examples were provided with tread patterns changed to adapt to each dimension parameter such as the groove area ratio GR set in each test tire based on the tread pattern of the Conventional Example, that is, the tread pattern in FIG. 3. Here, as an example, the tread pattern illustrated in FIG. 2 was provided in the tread part of the pneumatic tire according to Working Example 17. Similarly, in the pneumatic tires according to the Working Examples and Comparative Examples, as in the tread pattern illustrated in FIG. 2, the tread pattern was adapted to each dimensional parameter of each test tire by changing the groove area of the circumferential grooves 12 and the width direction grooves 16, the tire width direction position of the circumferential grooves 12, or the like based on the tread pattern in FIG. 3.

Working Examples 18 to 20 and Comparative Examples 4 and 5

The pneumatic tires according to Working Examples 18 to 20 and Comparative Examples 4 and 5 had tire sizes of 165/55R20. Furthermore, these pneumatic tires were test tires in which "GR" was 18%, "(GRo−GRi)/GR" was 0.32, and "CW/SW" was distributed in a range of 0.73 to 0.91. As described above, tread patterns changed based on FIG. 3 were provided in the tread parts of the pneumatic tires according to Working Examples 18 to 20 and Comparative Examples 4 and 5. Here, the pneumatic tires according to Working Examples 18 to 20 satisfied all of the relationships in Formulas <1> to <4>; however, the pneumatic tires according to Comparative Examples 4 and 5 did not satisfy the relationship in Formula <2>.

For the pneumatic tires according to the Conventional Example, Working Examples 15 to 20, and Comparative Examples 1 to 5, performance tests relating to the fuel economy index, the steering stability, and the water drainage properties during turning were performed. Table 4 illustrates the values relating to the dimensions of each test tire and the performance test results.

TABLE 4

|  | Conventional Example | Comparative Example 1 | Comparative Example 2 | Working Example 15 | Working Example 16 | Working Example 17 |
|---|---|---|---|---|---|---|
| Nominal Width | 205 | 165 | 165 | 165 | 165 | 165 |
| Aspect ratio | 55 | 55 | 55 | 55 | 55 | 55 |
| Inner diameter [inches] | 16 | 20 | 20 | 20 | 20 | 20 |
| OD[mm] | 632 | 695 | 695 | 695 | 695 | 695 |
| SW/OD | 0.32 | 0.24 | 0.24 | 0.24 | 0.24 | 0.24 |
| GR % | 30 | 30 | 5 | 11 | 17 | 24 |
| CW/SW | 0.7 | 0.82 | 0.82 | 0.82 | 0.82 | 0.82 |
| (GRi − GRo)/GR | 0 | 0.32 | 0.32 | 0.32 | 0.32 | 0.32 |
| Fuel economy index [—] | 100 | 100.5 | 100.4 | 100.4 | 100.5 | 100.5 |
| Steering stability[—] | 100 | 95 | 105 | 104 | 103 | 100 |
| Water drainage properties during turning [—] | 100 | 107 | 85 | 100 | 102 | 104 |

|  | Comparative Example 3 | Comparative Example 4 | Working Example 18 | Working Example 19 | Working Example 20 | Comparative Example 5 |
|---|---|---|---|---|---|---|
| Nominal Width | 165 | 165 | 165 | 165 | 165 | 165 |
| Aspect ratio | 55 | 55 | 55 | 55 | 55 | 55 |
| Inner diameter [inches] | 20 | 20 | 20 | 20 | 20 | 20 |
| OD[mm] | 695 | 695 | 695 | 695 | 695 | 695 |
| SW/OD | 0.24 | 0.24 | 0.24 | 0.24 | 0.24 | 0.24 |

TABLE 4-continued

| GR % | 27 | 18 | 18 | 18 | 18 | 18 |
|---|---|---|---|---|---|---|
| CW/SW | 0.82 | 0.73 | 0.78 | 0.83 | 0.87 | 0.91 |
| (GRi − GRo)/GR | 0.32 | 0.32 | 0.32 | 0.32 | 0.32 | 0.32 |
| Fuel economy index [—] | 100.5 | 100.5 | 100.5 | 100.5 | 100.4 | 100.4 |
| Steering stability[—] | 97 | 99 | 101 | 103 | 103 | 104 |
| Water drainage properties during turning [—] | 106 | 103 | 103 | 102 | 101 | 99 |

According to the performance test results in Table 4, the pneumatic tires according to Working Examples 15 to 20 satisfying the relationships in Formulas <1> to <4> had performances exceeding the fuel economy index, and maintaining or exceeding both of the steering stability and the water drainage properties during turning relative to the Conventional Example. With respect to this, for the pneumatic tires according to Comparative Examples 1 to 5, one of the steering stability or the water drainage properties during turning was less than the Conventional Example and it was not possible to achieve both of these performances.

Working Examples 21 to 24

The pneumatic tires according to Working Examples 21 to 24 were test tires with a tire size of 165/55R20 and test tires in which "(GRo−GRi)/GR" was distributed in a range of 0.05 to 0.8. As described above, tread patterns changed based on the tread pattern of the Conventional Example were provided in the tread parts of the pneumatic tires according to the Working Examples. Here, the pneumatic tires according to Working Examples 21 to 24 satisfied the relationships in Formulas <1> to <4> and the pneumatic tires according to Working Examples 22 and 23 satisfied Formula 5<5>, while the pneumatic tires according to Working Examples 21 and 24 did not satisfy Formula <5>.

For the pneumatic tires according to the Conventional Example and Working Examples 21 to 24, performance tests relating to the fuel economy index, the steering stability, and the water drainage properties during turning were performed. Table 5 illustrates the values relating to the dimensions of each test tire and the performance test results.

TABLE 5

| | Conventional Example | Working Example 21 | Working Example 22 | Working Example 23 | Working Example 24 |
|---|---|---|---|---|---|
| Nominal Width | 205 | 165 | 165 | 165 | 165 |
| Aspect ratio | 55 | 55 | 55 | 55 | 55 |
| Inner diameter [inches] | 16 | 20 | 20 | 20 | 20 |
| OD [mm] | 632 | 695 | 695 | 695 | 695 |
| SW/OD | 0.32 | 0.24 | 0.24 | 0.24 | 0.24 |
| GR % | 23 | 18 | 18 | 18 | 18 |
| CW/SW | 0.7 | 0.82 | 0.82 | 0.82 | 0.82 |
| (GRi − GRo)/GR | 0 | 0.05 | 0.1 | 0.6 | 0.8 |
| Fuel economy index [—] | 100 | 100.5 | 100.5 | 100.5 | 100.5 |
| Steering stability [—] | 100 | 105 | 104 | 101 | 100 |
| Water drainage properties during turning [—] | 100 | 100 | 102 | 104 | 105 |

According to the performance test results in Table 5, the pneumatic tires according to Working Examples 22 and 23 satisfying the relationship in Formula <5> balanced the steering stability and the water drainage properties during turning at a higher level than the pneumatic tires according to Working Examples 21 and 24 which did not satisfy the relationship in Formula <5>.

Working Examples 25 to 28

The pneumatic tires according to Working Examples 25 to 28 had tire sizes of 165/55R20 and, as described above, were provided with tread patterns changed based on the tread pattern of the Conventional Example in the tread parts of the pneumatic tires according to these Working Examples. The pneumatic tires according to Working Examples 25 to 28 satisfied all of the relationships in Formulas <1> to <5>. Furthermore, the pneumatic tire according to Working Example 26 satisfied the relationship in Formula <6>, the pneumatic tire according to Working Example 27 satisfied the relationship in Formula <7>, and the pneumatic tire according to Working Example 28 satisfied both of the relationships in Formula <6> and Formula <7>. Meanwhile, the pneumatic tire according to Working Example 25 did not satisfy either of the relationships in Formula <6> or Formula <7>.

For the pneumatic tires according to the Conventional Example and Working Examples 25 to 28, performance tests relating to the fuel economy index, the steering stability, and the water drainage properties during turning were performed. Table 6 illustrates the values and conditions relating to the dimensions of each test tire and the performance test results. Here, the field "GRoi vs. GRio" in Table 6 indicates the magnitude relationship between "GRoi" and "GRio" and whether or not Formula <6> was satisfied. In addition, the field "GRoi vs. GRoo" indicates the magnitude relationship between "GRoi" and "GRoo" and whether or not Formula <7> was satisfied.

TABLE 6

|  | Conventional Example | Working Example 25 | Working Example 26 | Working Example 27 | Working Example 28 |
|---|---|---|---|---|---|
| Nominal Width | 205 | 165 | 165 | 165 | 165 |
| Aspect ratio | 55 | 55 | 55 | 55 | 55 |
| Inner diameter [inches] | 16 | 20 | 20 | 20 | 20 |
| OD [mm] | 632 | 695 | 695 | 695 | 695 |
| SW/OD | 0.32 | 0.24 | 0.24 | 0.24 | 0.24 |
| GR % | 30 | 18 | 18 | 18 | 18 |
| CW/SW | 0.7 | 0.82 | 0.82 | 0.82 | 0.82 |
| (GRi − GRo)/GR | 0 | 0.32 | 0.32 | 0.32 | 0.32 |
| Groi vs. GRio | GRoi = GRio | GRoi < GRio | GRoi > GRio | GRoi < GRio | GRoi > GRio |
| Groi vs. GRoo | GRoi = GRoo | Groi < GRoo | GRoi < GRoo | GRoi > GRoo | GRoi > GRoo |
| Fuel economy index [—] | 100 | 100.5 | 100.5 | 100.5 | 100.5 |
| Steering stability [—] | 100 | 101 | 101 | 103 | 103 |
| Water drainage properties during turning [—] | 100 | 102 | 103 | 102 | 103 |

The pneumatic tires according to Working Example 26 and Working Example 28 satisfying Formula <6> each exceeded the pneumatic tires according to Working Example 25 and Working Example 27 which did not satisfy Formula <6> in terms of the water drainage properties during turning. Furthermore, the pneumatic tires according to Working Example 27 and Working Example 28 satisfying Formula <7> each exceeded the pneumatic tires according to Working Example 25 and Working Example 26 which did not satisfy Formula <7> in terms of the steering stability.

The present technology is defined as follows.

(1) A pneumatic tire has an asymmetrical pattern formed by grooves formed on a tread part,
wherein a ratio between a total width SW and an outer diameter of the pneumatic tire satisfies a relationship SW/OD≤0.3
and,
when a ground contact width in a ground contact region in the tread part is set as CW and a groove area ratio is set as GR, a range, when the pneumatic tire is mounted on a vehicle, positioned from a tire equator line to the vehicle side in the ground contact region is set as a tire inner side region Ai and a groove area ratio in the tire inner side region Ai is set as GRi, and a range, when the pneumatic tire is mounted on a vehicle, positioned from the tire equator line to the opposite side to the vehicle side in the ground contact region is set as a tire outer side region Ao and a groove area ratio in the tire outer side region Ao is set as GRo, the ground contact region is formed so as to satisfy relationships
0.75≤CW/SW≤0.9,
10%≤GR≤25%, and
GRi<GRo.
(2) The pneumatic tire according to (1), wherein GR, GRi, and GRo satisfy a relationship
0.1≤(GRo−GRi)/GR≤0.6.
(3) The pneumatic tire according to (1) or (2), wherein, when a range in the tire inner side region Ai having a width corresponding to 25% of the ground contact width CW positioned on the tire equator line side is set as an inner-outer side region Aio and the groove area ratio in the inner-outer side region Aio is set as GRio, and, when a range in the tire outer side region Ao having a width corresponding to 25% of the ground contact width CW positioned on the tire equator line side is set as an outer-inner side region Aoi and the groove area ratio in the outer-inner side region Aoi is set as GRoi,
GRoi>GRio
is satisfied.
(4) The pneumatic tire according to any one of (1) to (3), wherein, when a range in the tire outer side region Ao having a width corresponding to 25% of the ground contact width CW positioned on the tire equator line side is set as a tire outer-inner side region Aoi and the groove area ratio in the tire outer-inner side region Aoi is set as GRoi, and, when a range in the tire outer side region Ao having a width corresponding to 25% of the ground contact width CW positioned on the tire width direction ground contact edge side is set as a tire outer-outer side region Aoo and the groove area ratio in the outer-outer side region Aoo is set as GRoo, a relationship
GRoi>GRoo
is satisfied.
(5) The pneumatic tire according to any one of (1) to (4), wherein a circumferential groove extending in the circumferential direction is provided in a center region Ac centering on the tire equator line and having a width of 40% of the ground contact width CW.
(6) The pneumatic tire according to any one of (1) to (5), wherein a width direction groove extending in a direction crossing the tire equator line is provided in the tread part,
and the width direction groove is inclined relative to the tire width direction.
(7) The pneumatic tire according to (6), wherein an angle of inclination of the width direction groove provided in the tire outer side region Ao of the width direction grooves with respect to the tire width direction is greater than an angle of inclination of the width direction groove provided in the tire inner side region Ai of the width direction grooves with respect to the tire width direction.
(8) The pneumatic tire according to any one of (1) to (7), wherein, in the tire inner side region Ai and the tire outer side region Ao, a circumferential direction narrow groove extending in the tire circumferential direction is provided in at least one of shoulder regions As each having a width of 15% of the ground contact width CW from the ground contact edge to the tire equator line in the tire width direction.

(9) The pneumatic tire according to any one of (1) to (8), wherein sipes extending in a direction crossing the tire equator line are provided in the tire inner side region Ai.

What is claimed is:

1. A pneumatic tire having an asymmetrical pattern formed by grooves formed on a tread part, wherein
the grooves comprise two circumferential main grooves and two circumferential thin grooves that have groove widths thinner than those of the two circumferential main grooves, wherein the two circumferential main grooves are the only circumferential main grooves of the asymmetrical pattern,
a land portion formed between the two circumferential main grooves includes a tire equator line and no grooves or notches,
a ratio between a total width SW and an outer diameter OD of the pneumatic tire satisfies a relationship SW/OD≤0.3, and
when a ground contact width in a ground contact region in the tread part is set as CW and a groove area ratio is set as GR, a range, when the pneumatic tire is mounted on a vehicle, positioned from the tire equator line to a vehicle side in the ground contact region is set as a tire inner side region Ai and a groove area ratio in the tire inner side region Ai is set as GRi, and a range, when the pneumatic tire is mounted on a vehicle, positioned from the tire equator line to the opposite side to the vehicle side in the ground contact region is set as a tire outer side region Ao and a groove area ratio in the tire outer side region Ao is set as GRo, the ground contact region is formed so as to satisfy relationships
0.82≤CW/SW≤0.9,
10%≤GR≤25%, and
GRi<GRo.

2. The pneumatic tire according to claim 1, wherein GR, GRi, and GRo satisfy a relationship
0.1≤(GRo-GRi)/GR≤0.6.

3. The pneumatic tire according to claim 1, wherein, when a range in the tire inner side region Ai having a width corresponding to 25% of the ground contact width CW positioned on a tire equator line side is set as an inner-outer side region Aio and a groove area ratio in the inner-outer side region Aio is set as GRio, and, when a range in the tire outer side region Ao having a width corresponding to 25% of the ground contact width CW positioned on the tire equator line side is set as an outer-inner side region Aoi and a groove area ratio in the outer-inner side region Aoi is set as GRoi,
GRoi>GRio
is satisfied.

4. The pneumatic tire according to claim 1, wherein, when a range in the tire outer side region Ao having a width corresponding to 25% of the ground contact width CW positioned on a tire equator line side is set as an outer-inner side region Aoi and a groove area ratio in the outer-inner side region Aoi is set as GRoi, and, when a range in the tire outer side region Ao having a width corresponding to 25% of the ground contact width CW positioned on a tire width direction ground contact edge side is set as a tire outer-outer side region Aoo and a groove area ratio in the outer-outer side region Aoo is set as GRoo, a relationship
GRoi>GRoo
is satisfied.

5. The pneumatic tire according to claim 1, wherein the two circumferential main grooves are provided in a center region Ac centering on the tire equator line and having a width of 40% of the ground contact width CW.

6. The pneumatic tire according to claim 1, wherein
width direction grooves extending in a direction crossing the tire equator line are provided in the tread part, and
the width direction grooves are inclined relative to a tire width direction.

7. The pneumatic tire according to claim 6, wherein
the width direction grooves include a width direction groove provided in the tire outer side region Ao and a width direction groove provided in the tire inner side region Ai; and
an angle of inclination of the width direction groove provided in the tire outer side region Ao is greater than an angle of inclination of the width direction groove provided in the tire inner side region Ai.

8. The pneumatic tire according to claim 1, wherein, in the tire inner side region Ai and the tire outer side region Ao, the two circumferential thin grooves are provided in shoulder regions As each having a width of 15% of the ground contact width CW from a ground contact edge to the tire equator line in a tire width direction.

9. The pneumatic tire according to claim 1, wherein sipes extending in a direction crossing the tire equator line are provided in the tire inner side region Ai.

10. The pneumatic tire according to claim 2, wherein, when a range in the tire inner side region Ai having a width corresponding to 25% of the ground contact width CW positioned on a tire equator line side is set as an inner-outer side region Aio and a groove area ratio in the inner-outer side region Aio is set as GRio, and, when a range in the tire outer side region Ao having a width corresponding to 25% of the ground contact width CW positioned on the tire equator line side is set as an outer-inner side region Aoi and a groove area ratio in the outer-inner side region Aoi is set as GRoi,
GRoi>GRio
is satisfied.

11. The pneumatic tire according to claim 10, wherein, when a range in the tire outer side region Ao having a width corresponding to 25% of the ground contact width CW positioned on the tire equator line side is set as an outer-inner side region Aoi and a groove area ratio in the outer-inner side region Aoi is set as GRoi, and, when a range in the tire outer side region Ao having a width corresponding to 25% of the ground contact width CW positioned on a tire width direction ground contact edge side is set as a tire outer-outer side region Aoo and a groove area ratio in the outer-outer side region Aoo is set as GRoo, a relationship
GRoi>GRoo
is satisfied.

12. The pneumatic tire according to claim 11, wherein the two circumferential main grooves are provided in a center region Ac centering on the tire equator line and having a width of 40% of the ground contact width CW.

13. The pneumatic tire according to claim 12, wherein
width direction grooves extending in a direction crossing the tire equator line are provided in the tread part, and
the width direction grooves are inclined relative to a tire width direction.

14. The pneumatic tire according to claim 13, wherein
the width direction grooves include a width direction groove provided in the tire outer side region Ao and a width direction groove provided in the tire inner side region Ai; and
an angle of inclination of the width direction groove provided in the tire outer side region Ao is greater than an angle of inclination of the width direction groove provided in the tire inner side region Ai.

15. The pneumatic tire according to claim 14, wherein, in the tire inner side region Ai and the tire outer side region Ao, the two circumferential thin grooves are provided in shoulder regions As each having a width of 15% of the ground contact width CW from a ground contact edge to the tire equator line in the tire width direction.

16. The pneumatic tire according to claim 15, wherein sipes extending in a direction crossing the tire equator line are provided in the tire inner side region Ai.

17. The pneumatic tire according to claim 1, wherein 0.27<SW/OD <0.3.

18. The pneumatic tire according to claim 17, wherein 21%<GR<25%.

19. The pneumatic tire according to claim 1, wherein 21%<GR<25%.

20. The pneumatic tire according to claim 1, wherein a second land portion formed between one of the two circumferential main grooves and one of the two circumferential thin grooves comprises a block row.

21. The pneumatic tire according to claim 1, wherein shoulder lug grooves of the tire inner side region extend to the ground contact edge and terminate within the tread part without extending to one of the two circumferential main grooves.

22. Then pneumatic tire according to claim 21, wherein shoulder lug grooves of the tire outer side region communicate with one of the two circumferential main grooves.

23. The pneumatic tire according to claim 1, wherein lug grooves provided in the tread part are straight along an entire length of the lug grooves.

24. The pneumatic tire according to claim 23, wherein all of the two circumferential main grooves, the two circumferential thin grooves, and the lug grooves provided in the tread part are straight.

25. The pneumatic tire according to claim 1, further comprising an intermediate land portion between the land portion formed between the two circumferential main grooves and a shoulder land portion in the tire inner side region, the intermediate land portion comprising:

lug grooves extending from one of the two circumferential thin grooves and terminating within the intermediate land portion without communicating with one of the two circumferential main grooves; and sipes extending from the one of the two circumferential main grooves and terminating in the intermediate land portion without communicating with the one of the two circumferential thin grooves;

wherein the sipes and the lug grooves in the intermediate land portion are alternately disposed in the tire circumferential direction.

* * * * *